United States Patent
Casone et al.

(10) Patent No.: US 7,978,644 B2
(45) Date of Patent: Jul. 12, 2011

(54) METHOD OF FAIR SCHEDULING CHANNEL ACCESS IN A WIRELESS NETWORK

(75) Inventors: Luca Casone, San Cesario Di Lecce (IT); Roberto Miglietta, Torchiarolo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1144 days.

(21) Appl. No.: 11/456,790

(22) Filed: Jul. 11, 2006
(Under 37 CFR 1.47)

(65) Prior Publication Data

US 2008/0316958 A1    Dec. 25, 2008

(30) Foreign Application Priority Data

Jul. 12, 2005  (IT) ............... MI2005A001321

(51) Int. Cl.
| H04W 4/00 | (2009.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04B 7/00 | (2006.01) |
| H04L 12/413 | (2006.01) |
| H04W 72/00 | (2009.01) |

(52) U.S. Cl. ........ 370/328; 370/229; 370/310; 370/329; 370/338; 370/341; 370/448; 455/41.2; 455/450; 455/509

(58) Field of Classification Search ........... 370/329, 370/348, 310, 328, 338, 341, 448; 455/452.2, 455/453, 41.2, 450, 509
See application file for complete search history.

(56) References Cited

U.S. PATENT DOCUMENTS

| 5,436,903 | A  | * | 7/1995 | Yang et al. ............... 370/448 |
| 6,870,809 | B1 | * | 3/2005 | Vaidya et al. ............ 370/229 |
| 6,891,847 | B1 | * | 5/2005 | Gubbi ..................... 370/442 |
| 2002/0093953 | A1 | * | 7/2002 | Naim et al. .............. 370/386 |
| 2003/0007453 | A1 | * | 1/2003 | Ogier et al. .............. 370/229 |
| 2003/0058886 | A1 | * | 3/2003 | Stanforth et al. ........ 370/468 |

OTHER PUBLICATIONS

Bensau, Brahim et. al, Fair Medium Access in 802.11 based Wireless Ad-Hoc Networks, 2000, IEEE, pp. 99-106.*

* cited by examiner

*Primary Examiner* — Huy Phan
*Assistant Examiner* — Edd Rianne Plata
(74) *Attorney, Agent, or Firm* — William J. Kubida; Peter J. Meza; Hogan Lovells US LLP

(57) ABSTRACT

A method of fair scheduling for channel access in a wireless network comprising a plurality of nodes including a first node and at least one second node is described, the method comprising the steps of:
  arranging (RICP) a packet to be transmitted at the first node;
  calculating (COMP) a waiting time ($t_a$) for the first node;
  the first node attempting (ATTX) the transmission of the packet on the channel at least after the calculated waiting time;
  characterised in that said calculation step includes an evaluation step of a first size representative of the ratio between a real use of the channel by the first node and a real use of the channel by a group of the plurality of nodes, during the transmission on the network of further packets preceding said packet.

27 Claims, 4 Drawing Sheets

METHOD OF FAIR SCHEDULING CHANNEL ACCESS IN A WIRELESS NETWORK

FIELD OF THE INVENTION

The present invention refers to a network of wireless type and in particular to a method of scheduling for channel access in a network of wireless type.

STATE OF THE ART

The request for an increasingly effective support for users' mobility has driven the development of an emerging network typology: the Ad Hoc wireless networks, as described, for example, in the scientific article "*Le Wireless Ad Hoc Networks: analisi e scenari applicativi*" by D. Blasi and V. Cacace, *Degree Thesis Enclosure*, University of Lecce, Academic Year 2001/2002.

As is known, an Ad Hoc network does not have a stable and well-defined topology; it does not base its functioning on a pre-existing and fixed infrastructure but is dynamically composed of both fixed and mobile nodes equipped with a wireless network interface which permits them to directly communicate (this type of communication is also called "peer-to-peer").

An example of Ad Hoc network is represented in FIG. 1 wherein the nodes of the network (indicated in their entirety with the reference number 100) are respectively indicated with Nk, N1, N2 . . . N$_i$, N$_k$ . . . , N7, . . . N$_T$.

Unlike the wireless networks operating with fixed infrastructures, the Ad Hoc networks, not having dedicated network nodes (routers), delegate the discovery operations of the routes and routing of the traffic to the nodes which compose the network themselves. The nodes, therefore, in addition to the function of network terminal which produces/consumes user traffic, also carry out all of the functionalities which permit the network itself to function. This permits the communication between nodes, due simply to their presence; hence the (very concise) expression "Ad Hoc network built on the fly".

While in mobile telephone networks, the communication between two nodes is bound by the nearby presence of a fixed infrastructure, in the specific case a base station capable of transmitting the user traffic, or more in general constituting a "bridge" between them, in the Ad Hoc networks two nodes can directly communicate with each other, on the condition that one is found inside the "transmission range" of the other, without the necessary presence of another entity (also the definition of "peer-to-peer" rates). By "transmission range" it is intended the maximum distance at which, based on the propagation conditions of the transmission power set by the surrounding environment, two nodes can find each other in order to continue exchanging data packets.

In the wireless networks of Ad Hoc type, the devices forming the nodes must all collaborate with a totally distributed network management, each node operating for the other nodes as well as for itself. To such end, indicated with the term "multi-hopping" is the procedure with which the control/data packets transmitted by a source node, in order to reach a destination node which is remote with respect to the source node, are forwarded, "relayed" by the intermediate notes.

Moreover, in this context the expression "neighbours of a node X" is generally employed to indicate all nodes which are found inside the transmission range of X, with which the same node X can, interference being equal, establish an equal communication. Consequently, if a node A intends to communicate with another node B outside its own transmission range, it requires the collaboration of its neighbours in an Ad Hoc network. In other words, A assigns its neighbours the task of forwarding the packets which it intends to send to B; the nodes close to A will attempt to deliver to station B, or will in turn ask their neighbours for collaboration. There derives a relaying delivery from A towards B, from neighbour to neighbour, by means of a wireless link sequence ("multi-hop").

To permit the functioning in "multi-hopping" mode, the nodes of an Ad Hoc network must incorporate, as said, the typical functionalities of the hosts and routers of the traditional networks. Moreover, since a network of this type only exists due to the presence of the nodes, the so-called auto-configuration and auto-coordination concepts become fundamental: the devices forming the nodes of an Ad Hoc network must all collaborate in a totally distributed network management, each operating for the others as for itself.

Moreover, it is generally assumed that the nodes forming an Ad Hoc wireless network all use the same communication interface and the same radio transmission channel: this effects how the nodes themselves must access, and use, said radio channel. To illustrate, the fact that a second node must forward the preceding packets received by a first node means that, for an adequately sized interval, the first node must refrain from attempting other transmissions, "surrendering" the use of the channel to the second node. If this did not occur, the activity of the first node would interfere with that of the second node, which would then not be able to effectively carry out its function as router.

Given the particular characteristics which distinguish the Ad Hoc networks from those more traditional, of both wired and wireless infrastructure (as the cellular networks can be), many solutions and protocols have been ideated for them.

The aspects covered are very different and extend over practically the entire ISO/OSI model stack: the network level, and in particular, the routing protocols, conventionally one of the very first aspects faced; the transport level, above all studies on the TCP protocol to demonstrate that, without modifications, it cannot offer considerable performances; the data link level, and in particular the medium access protocols (MAC, Medium Access Control) for an efficient management of the transmission attempts. With regard to this last point, in consideration above all of the particular characteristics of radio channel and use, rather common, of omni-directional antennas, the wireless data transmissions have encountered a series of problems which are not verifiable in wired transmissions. The main cause is in the manner wherein the transmission power is propagated in the medium which determine, on one hand, the impossibility to precisely define the borders of a collision domain, and on the other hand the possibility that they form, in a wireless ad hoc network, different, partially overlapping collision domains. This means that, contrary to the cable signalling, it is not possible for a node, listening to the local state of the channel, to know the outcome of its current transmission. The direct consequence of this peculiarity is the well known problem of the hidden terminal, as already discussed for example in the scientific article "*Packet switching in radio channels: Part II—the hidden terminal problem in carrier sense multiple-access modes and the busy-tone solution*" by F. A. Tobagi and L. Kleinrock, *IEEE Transactions on communications*, Vol. 23, No. 12, pp. 1417-33, December 1975. In an ad hoc network, two nodes are said to be hidden from each other if their distance is greater than the typical transmission range; in this situation, since neither of the two are capable of detecting the busy channel due to the transmission of the other, the two possible transmissions, if simultaneous, collide against possible intermediate nodes, and therefore are not capable of correctly receiving from any of the two sources. It is evident that, if not adequately faced, this problem can lower the performances of the network (for example, in terms of throughput). In fact, with the lack of specific mechanisms, these two nodes do not succeed in detecting the missed reception by the intermediate node, consequently wasting both time and energy.

To resolve this problem, and more in general to make the channel use as efficient as possible, different MAC protocols been proposed in the literature. Among the most important standards to mention is without a doubt the standard for WLAN (Wireless Local Area Networks) IEEE 802.11, defined in "IEEE 802.11 WG IEEE Std. 802.11, 1999 ed, Part II: Wireless LAN MAC and PHY layer specs. 1999", standard belonging to the "Contention Based" MAC protocol family, which permit a node to attempt the channel access each time it has a data packet to send, avoiding (if possible) and managing the collisions which this type of asynchronous accesses inevitably generates.

The 802.11 standard MAC protocol is a protocol of Carrier Sense Multiple Access with Collision Avoidance (CSMA/CA) type: each node, before attempting to send, listens to the channel, and turns on only when it does not appear occupied by other transmissions; it attempts, moreover, by means of an appropriate (optional) exchange of control frame before the actual data frame (handshaking) to avoid the occurrence of the collisions—much more complicated to manage, as said, with respect to the wired case. The 802.11 standard provides two channel access modes: The DCF (Distributed Coordination Function), for WLAN of "ad hoc" type, i.e. composed only of mobile stations; the PCF (Point Coordination Function), for WLAN with access points (ignored in this work). The DCF provides one channel access of basic type and one of type RTS/CTS. The basic access method is composed only of the exchange of the data packet and the acknowledgement between the source and destination pair. The RTS/CTS channel access method is used for taking on the problem of the "hidden terminal" and requires an additional handshake, i.e. the exchange of the RTS (Request-to-Send) and CTS (Clear-to-Send) packets between the source and destination pair, before the transmission of the data packet. The management of the collisions occurs by means of the well-known Binary Exponential Back-off (BEB) algorithm: at every failed transmission (no ACK or CTS received), the MAC randomly chooses a idle slot value inside the contention window [0, CW], not before, however, having doubled the value of CW (up to an upper limit CWmax); in case of successful transmission, on the other hand, CW is set at the minimum value CWmin and the transmission of the possible subsequent packet occurs after a number of slots chosen randomly inside the new window.

The 802.11 standard in DCF mode was originally designed for networks of WLAN type, wherein the transmission of a node can be potentially received by any other node composing the WLAN network.

Its simplicity has made it employable also for the wireless "multi-hop" Ad Hoc networks. It should be noted, however, that networks of this type have situations (in terms of topology) which are different with respect to those verifiable in a WLAN, which makes it difficult for the 802.11 MAC to ensure a fair channel access possibility to all nodes.

More specifically, in topologies of networks in which all nodes are inside the transmission range of other nodes, the nodes have very similar information regarding the state of the channel, which leads them to compete for the use of the channel in nearly equal conditions, and consequently have equivalent probabilities regarding the transmission attempts; over the long term, therefore, such nodes are able to equally subdivide the available (channel) resource.

On the other hand, in situations where not all nodes are inside the transmission range of the other, the probability of capturing the channel varies from node to node, since the "perceived" state on the channel, state which influences the behaviour of the MAC protocol, is different from node to node. The different channel access probability leads to a great difference in the throughput achieved by the nodes of the network. To such end, the scientific article "Ordered Packet Scheduling in Wireless Ad Hoc Networks: Mechanisms and Performance Analysis" by V. Kanodia, C. Li, A. Sabharwal, B. Sadeghi and E. Knightly, in *Proc. Mobile Ad Hoc Networking Computing*, 2002, pp. 58-70 is cited.

In FIGS. 4 and 5, two examples are reported wherein the 802.11 MAC protocol is not able to set a fair use of the channel for all nodes. In FIG. 4, the receiver node 2 of the flow A is in the transmission range of the flow B, while the transmitter node 1 of the flow A has no knowledge of flow B. In this situation, the flow B obtains a throughput which is clearly greater than that obtained by flow A. The transmitter node 3 of B can listen to the frames of the receiver node 2 of A, and contend for the channel when the transmission underway has terminated, consequently it can contend for the use of the channel at the end of every correct transmission of one of the two flows. On the other hand, the transmitter node 1 of the Flow A cannot listen to any packet of the Flow B, and attempts to gain access to the channel through continuous RTS requests. The receiver node 2 of A cannot reply to the RTS packets received until the transmission underway of Flow B does not end, thus the node 1 goes into time-out and doubles its contention window. Since the data frame is much larger than the control frames, and since the contention window can become rather large, and B sets the contention window at the minimum value after every transmission, the probability of the Flow A capturing the channel is much smaller than that of Flow B.

In FIG. 5 a second example of the situation is reported wherein the 802.11 standard does not ensure a fair use of the channel. It should be noted that, while in the first example of FIG. 4 the greater availability of information on the system state brings the Flow B to attain a greater throughput, this is not true in this second example. Indeed, with reference to FIG. 5, the Flow B has information on Flows A and C, while A and C do not have knowledge of any other flow on the network. Each time that A or C capture the transmission medium, and can use it simultaneously due to the spatial reuse of the channel, the Flow B suspends access to the channel, based on the listened CTS packets. In this case, the greater information to B on the flows with which it competes for accessing the medium leads it to delay its transmissions more often. The flow B succeeds in accessing the channel when A and C are simultaneously in back-off mode. After the acquisition of the medium, B can maintain access for several consecutive transmissions. In this case the same situation as in FIG. 4 would be repeated. It is noted that with the increase of the number of contending flows, it is less probable that these are all simultaneously in back-off, but increases the probability that the control packets collide, reducing the quantity of information available for B.

For both the first and second situation example, please see the already mentioned article "Ordered Packet Scheduling in Wireless Ad Hoc Networks: Mechanisms and Performance Analysis" by V. Kanodia, C. Li, A. Sabharwal, B. Sadeghi and E. Knightly.

In general, therefore, the use of a shared resource (channel) by different entities (nodes) which compete in order to use it, in the absence of an appropriate regulation mechanism, can lead to a imbalance in the quantity of resource which every contender utilises and therefore in the benefits obtained by the use of the same; consequently, some entities may succeed in satisfying their needs more than others. This is also true for the calculator networks where the existing MAC protocols lead the different contending entities to use the common resource, the channel, in a mode strongly dependent on their perception of the contention level, which if incorrect leads to an inadequate division of the band for the requests. This is not acceptable in a Wireless Ad-Hoc Network, where the different nodes composing it must cooperate in order to permit the correct functioning of the network. In fact, with the presence of the multi-hop, a node must not only clear its own traffic, but also forward the packets received from a station with which it is in visibility. If a very small bandwidth is assigned to one node, the network may function poorly. Such node, in fact, not only does not succeed in clearing its own traffic, but— potentially even more serious—is not capable of forwarding packets on behalf of other nodes.

The object of the present invention is to propose a method which defines an access policy to the radio channel capable of overcoming the drawbacks of the prior art, ensuring, also in phases of considerable congestion, a fair use of the channel by the network nodes. Particularly, but not exclusively, a method is proposed which can be implemented on top of the current access protocols, resulting independent from these and which does not require modifications of that which is typically implemented in hardware or firmware, but rather can be realised via software so to permit a possible simplified implementation in a wireless network, for example of ad hoc type.

SUMMARY OF THE INVENTION

Such object is attained by the method as defined and characterised in claim 1. Preferred embodiments are defined by the dependent claims 2-23. Also object of the present invention are: a network node as defined in claim 24; a computer program as defined in claim 25; a wireless network as defined in claim 26.

The Applicant reports the following considerations with regard to the particular features of the invention.

First, it should be observed how it is possible to subdivide all of the problems faced by any MAC protocol for wireless networks into two connected sub-problems: the scheduling and the channel access.

The scheduling identifies the intelligent part of the MAC, that which is entrusted to decide the moment of time wherein a node can attempt a transmission. The channel access regards the procedures necessary for the acquisition of the channel by the station, procedures which in a wireless environment are necessary for protecting the data frames from possible collisions. Many MAC protocols attentively face the second sub-problem, defining precise procedures which generally involve precise waiting times and the exchange of appropriate control packets; they usually devote simple solutions to the first sub-problem, with the main objective of randomly distributing the access attempts over time such that any single station cannot block the transmissions of the stations adjacent to it.

The Applicant, moreover, observes that any one new strategy of medium access control can be advantageously defined by working on only one of these two sub-levels rather than on both: essentially, one can define a new initial sequence of control packets and/or process new definition procedures of access times which, for example, take in consideration various node and system information in order to improve the effectiveness of the channel use.

Moreover, it should be noted that the Applicant observes that the opportunity to take in due consideration the existence of Standard MAC protocols, has led to preferably focus the present invention on the Scheduling sub-problem. The calculation of the times wherein the nodes can attempt a transmission is a simple manner, implementable via software, and potentially very effective mode with which the use level of the radio channel can be increased. On the other hand, it should also be considered that, quite advantageously, this method permits not having to ideate any new access mechanism to the channel (resolving the sub-problem of the channel access), but, rather, utilising the existing mechanism, it can be easily integrated into an already defined MAC.

The Applicant underlines that the main characteristic, on which the definition of a scheduling algorithm is based, is the so-called fairness. The algorithm, in fact, in relation with appropriate metrics, must ensure that at every node, the use of a resource quantity (channel) such to be considered fair with respect to that assigned the other channels. The significance of fair depends on the metrics which are considered and managed by the scheduler. The comparison criteria can regard, for example: the delay with which a node transmits its own packets or forwards those of the others; or the quantity of employed band (absolute or relative).

In the present description, the fairness is related to the duration of use of the channel by one node. In the set up of the problem for obtaining the solution defined by the present invention, a model was adopted for representing the generic concept of "node importance", and the scheduling algorithm is such that it is driven by it, so that each node can be assigned a band quantity proportional to its level of importance. One such scheme finds possible application in many situations which can be verified, for example, inside a wireless Ad Hoc network, and offers an effective two-level support.

The importance of a node can be defined, for example, based on the number of routes which cross it, rather than by the possible role which the node itself covers inside a clustering protocol, which hierarchically organises the devices.

The applicant proposes a so-called distributed scheduling algorithm, identically executed, advantageously, by all nodes and which can be implemented on the medium access protocol, resulting therefore independent from the latter and ensuring a fair use of the channel by the network nodes in high congestion phases. The proposed algorithm permits each node (host) to autonomously and dynamically decide over time when it attempts to use the resource (channel), ensuring over time the achievement of the so-called fairness objective by all the nodes.

The Applicant shows that the present invention preferably but not exclusively fits in the scope of the medium access policies for wireless networks (Ad-Hoc Multi-Hop, among others): distributed, contention-based and without organisation of the time in slots/frames. These have the advantage of being simple and not requiring any infrastructure, and hence are the rather natural choice for the Wireless Ad Hoc networks.

In fact, every node advantageously executes the scheme in the same way as the others, without the need for any type of infrastructure which centralises the management of the channel (hence the term distributed is used). Behaviour of this type is moreover legitimate in a network which bases its functioning on the cooperation between the single nodes. With the term contention-based, the simplest protocol category is indicated: the accesses are attempted from the nodes in asynchronous manner with respect to the others, without having to cause, and consequently manage an explicit turnover. The choice of not foreseeing any organisation of the slot/frame time mainly leads to greater simplicity, given that it does not require the existence (not always realistic) of a common time reference point. Typical example of this type of medium access policy is the already mentioned IEEE 802.11 Standard MAC executed in DCF mode: in it, the Binary Exponential Back-off algorithm resolves the problem of the scheduling, while the initial exchange of control frame RTS/CTS, together with the final ACK frame, faces the channel access.

BRIEF DESCRIPTION OF THE FIGURES

The invention will be better understood from the following detailed description of one of its embodiments given as exemplifying with reference to the set of drawings, wherein.

DETAILED DESCRIPTION OF INVENTION EMBODIMENTS

Figure 1:
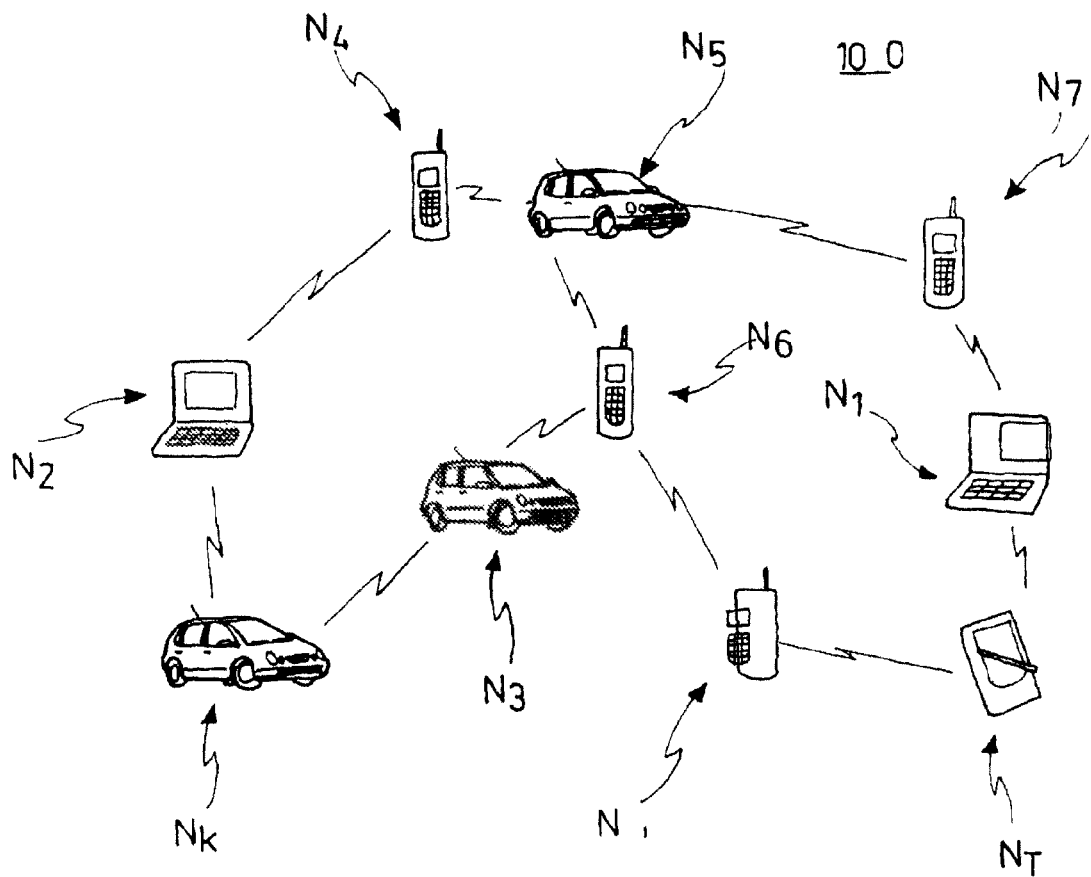
FIG. 1 shows a wireless network of Ad Hoc type in schematic mode.

In the figures, elements which are equivalent or similar will be indicated by means of the same reference numbers.
Initial Choices for the Problem Solution The present invention fits, according to a particular embodiment, in the scope of the medium access policies for distributed Wireless Ad-Hoc Multi-Hop networks, Contention-Based and asynchronous (i.e. without an organisation of the time in frames/slots). These represent a particularly advantageous choice for networks wherein the existence of some fixed infrastructure which can centralise particular management functions of the network cannot be assumed; where, consequently, all nodes can be considered equal; where the cooperation between the stations is that which by definition permits the data exchange.

In this example, an algorithm is referred to in accordance with the invention which is distributed (i.e., executed identically by all nodes), which works above the medium access protocol (MAC protocol) and which advantageously ensures, also in high congestion phases, a fair use (fairness) of the channel by the different nodes of the network.

It should be explicitly underlined how the choice of the complete independence of the scheduling algorithm by the underlying medium access protocol is demanding, putting a series of constraints on the ideation process, the most important of which is that no control information, possible necessary for the functioning of the algorithm, can be inserted in the control frame of the MAC.

Another preferred aspect is that the scheme of the invention must support the multi-hopping, i.e. permit the receiver of a packet to have a greater possibility to access the channel with respect to the transmitter, a fundamental point in Ad-Hoc networks, wherein the nodes must cooperate with each other to ensure its correct functioning. This, however, must not constitute a penalty in the case wherein the scheme is executed in the context of a WLAN, where every node of the network can potentially transmit to every other node belonging to the same network.

The equitable subdivision (fairness) of the time of transmission between the nodes of the network can be obtained by means of a policy based on the cooperation between the nodes. Such cooperation, however, must be guided by appropriate status information, mainly related to the other actors with which the generic node contends, information which the node itself must be capable of "reading" from the system. Considering, however, that the nodes are the only components of the system in question (an ad hoc wireless network), and that, therefore, they cannot be the only sources of the aforesaid status information, it derives that such "reading" cannot be implemented by means of appropriate exchanges (communications) of control information among nearby stations.

The scheduling algorithm in accordance with the invention, therefore, is in particular supported by an appropriate exchange of control information which above all takes into account the need of independence from the underlying medium access. To this end, it is useful to observe that this communication need is not easily resolvable. From the analysis of the prior art, in fact, any one scheduling policy on the nodes in an ad hoc network must coordinate the access attempts of the entities which are mutually spaced one and two hops: this places a number of problems in the definition of an effective mechanism for the exchange of control information.

There are two possible strategies based on which a scheduling algorithm can be defined for the network nodes. The first, here called "Strict", sets a strict control on the sequence with which the nodes access the channel, so to follow as faithfully as possible the turnover set by the reference scheduling policy; the second, indicated with the term "Loose", releases this constraint, proposing only to ensure each entity, as much as possible, a fair channel use, hence equitable with respect to that foreseen by the reference scheduling policy. The second approach rewards a potentially greater definition simplicity (thanks to the elimination of a limit) with the increase, with respect to the first, of the time window during which the system can register imbalances in the use of the shared resource by the contending entities, a time window during which, therefore, the system can be unfair.

Both proposed strategies require several considerations regarding their actuation. To be able to apply the Strict approach it is necessary: (1) that the station clears and updates its waiting time (before attempting the transmission of the current packet) every time that it succeeds in capturing a new packet from the channel, so to maintain as updated as possible the sequence of accesses based on the reference policy; (2) the propagation of the necessary information for the correct functioning of the algorithm must occur at the same time as the transmission, otherwise the status of the contending neighbours in possession of the generic entity, status leads the decisions of scheduling, can be excessively obsolete and no longer reflect the real status of the system, making said decisions insufficient (always with regard to a pre-selected scheduling policy); (3) given that it is presumably impossible to know the status of all contending entities, the quantity of information possibly estimated must be limited with respect to that updated, otherwise the algorithm would be strongly conditioned by the computed estimates, with the risk of considerably separating itself from the reference scheduling policy. It is noted that (1) requires considerable modifications of the MAC behaviour, which in general sets a new waiting time only at the end of a transmission term; moreover, the observations (2) and (3) are not practically realisable in the scheduling of the nodes, since it is impossible to realise a mechanism which informs all one or two hop neighbours of a transmitter node of the change of status of the node itself at the same time as the transmission itself; consequently, the entire policy must be based on the estimate of the status of many contending stations (in practice, all neighbours two hops away).

In the Loose approach, on the other hand, the waiting time can be managed in classic manner, i.e. set after the transmission of a packet, so that each entity, after having compared its status with that of its competitors, regulates its behaviour in order to recover or surrender, respectively less or more, the amount of service received. Moreover, not having to realise a sequence of accesses as close as possible to that generated by a possible reference scheduling policy, the Loose approach can also base its own functioning on status information, regarding the contending entities, which is not perfectly updated, since the objective in the mid-range period is that the entities are able to share the shared resource in a fair manner. Based on these considerations, this second approach would permit independence from the MAC protocol, given that no modification is required relative to the management of the waiting time, and more or less complex mechanisms are not defined for the updated maintenance of the information regarding the two hop neighbours.

Considering that stated above, the Loose approach was considered to be the most suitable for the development of a scheduling algorithm which must satisfy the described requirements, and was therefore chosen as the basis for definition of the present invention.

The Network and Several Aspects of the Algorithm of the Invention.

Summarising that underlined up to now, the particular example of the described invention regards a scheduling algorithm which: is distributed; manages the nodes; is placed above a medium access scheme without however imposing any modifications; operates on the time which a node must wait before attempting the transmission of the current data packet, hence acting dynamically (as it can be for a typical MAC protocol) on the back-off value.

Below an exemplifying scheme is set forth, in accordance with the invention, which satisfies all these requirements, and for this it is called BDNS, i.e. Back-off based Distributed Nodes Scheduling.

The wireless network 100 of FIG. 1 is considered, comprising a plurality of nodes including the node Nk and the nodes N1, ..., N8, ... Ni. The network 100 can be of SCD (Single Collision Domain) type, where every transmission is potentially receivable by all nodes of the network or it is of MCD (Multiple Collision Domain) type, where the area covered by the network is greater than the typical maximum correct reception distance.

One example of SCD network to which the present invention is applicable is the WLAN (Wireless Local Area Network).

In particular, the network 100 can be preferably an ad hoc network, to operate in Multi Hopping mode. The Multi Hopping networks and the Ad-Hoc networks were already defined in the introductive part.

The nodes Nk and N1, N3, Ni, ... NT, can for example be one or more of the following devices: cellular telephones, PDAs, Personal Computers and the like. Every node of the plurality Nk-NT is equipped with a processing device (for example, a microprocessor and with related memories) capable of executing, among other things, a computer program (i.e. appropriate software) corresponding to the scheduling algorithm which will be described below. The nodes Nk-NT communicate by means of a same radio channel to which they can access by means of the same MAC protocol, such as for example the 802.11 MAC protocol.

Moreover, it is useful to define what it intended by fair use of the resource channel by nodes in a wireless network, and consequently the fairness objective followed by the distributed scheduling algorithm of the nodes of the invention.

The paradigm proposed by the FFQ scheme (see the article by S. J. Golestani, "A Self-Clocked Fair Queuing Scheme for Broadband Applications", in Proc. IEEE INFOCOM '94, April 1994, pages 636-646) is simple but at the same time flexible enough to permit use rates of the channel which are possibly differentiated from node to node. It has been chosen, therefore, to adopt this scheme.

The scheduling algorithm according to the embodiment of the invention, therefore, follows the following fairness objective: every node Nk-NT is believed to be assigned a weight, on the basis of which the amount of normalised traffic transmitted by the same is measured (amount of traffic transmitted normalised with regard to the weight of the node). Each host (i.e. node) must engage the channel so to keep its normalised traffic equal to that of the other nodes contending with it (one and two hops away).

Overall, the scheduling algorithm described here dynamically modulates the idle back off (or, in other words, the waiting time) of each node, in order to reduce possible difference in terms of normalised traffic: subsequent greater waiting times must correspond to a preceding greater use of the channel, and vice-versa.

The Algorithm as Theoretic Solution of the Problem

In this section, the theoretical resolution of the problem will be shown which leads to the definition of the algorithm implemented by the invention.

It is assumed that every node Nk-NT through some mechanism knows, moment for moment, the weight and current service tag (defined immediately after) of all its one and two hop neighbours (it will be illustrated below how such information, necessary for the correct functioning of the scheme, will be effectively propagated). It is not, moreover, considered overhead of any type introduced by the MAC protocol, since the scheduling algorithm, being independent with respect to it and placed immediately above it in the ISO/OSI protocol structure, can work exclusively on the times necessary for the transmission of the data packets.

In the following description, the following symbols will be adopted:

$S_k^l$: service tag/quantity of normalised traffic generated by the k-th node (such has the node Nk) once the l-th packet is transmitted;

$S_k(t)$: service tag/quantity of normalised traffic transmitted in [0,t] by the k-th node;

$L_k^i$: length in bytes of the i-th packet transmitted by the node k;

$l_k(t)$: number of packets transmitted by the node k up to the instant t;

$t_k^p$: instant of time wherein the node k terminates the transmission of the packet p;

$r_k$: weight associated with the node k (i.e. the node Nk);

$\Delta t_k(t)$ time undertaken by the station k in the transmission of the data packets in the time span [0,t];

C: channel data rate [bytes/s];

N: set of all nodes of the network ({Nk, ... NT});

d(i,k): distance in the number of hops between the node i and the node k—as a special case, d(i,i)=0;

$B_k = \{i \in N | d(i,k) \leq 2\}$: set formed by the node k, NK, and by all competing stations (all those one and two hops away from the node k).

Considering the arbitrary node k, setting the total amount of time to 1 during which the stations in $B_k$ used the channel, the use of the channel by the node k can be defined at the instant t as the fraction of the transmission time used by k, that is:

$$\tilde{R}_k(t) = \frac{\Delta t_k(t)}{\sum_{i \in B_k} \Delta t_i(t)} \quad (1)$$

In $\Delta t_k(t)$, the node k has cleared a quantity of traffic equal to $$C\Delta t_k(t) = \sum_{i=1}^{l_k(t)} L_k^i \quad (2)$$

Dividing both the members of (2) by $r_k$ it follows that $$\frac{C\Delta t_k(t)}{r_k} = \frac{1}{r_k}\sum_{i=1}^{l_k(t)} L_k^i = \sum_{i=1}^{l_k(t)} \frac{L_k^i}{r_k} = S_k(t) \Leftrightarrow \Delta t_k(t) = \frac{r_k S_k(t)}{C} \quad (3)$$

Substituting the result of (3) into (1) one obtains:

$$\tilde{R}_k(t) = \frac{\Delta t_k(t)}{\sum_{i \in B_k} \Delta t_i(t)} = \frac{r_k S_k(t)}{\sum_{i \in B_k} r_i S_i(t)} \quad (4)$$

If the scheduling was ideal, and permitted assigning the nodes arbitrarily small service amounts, it would result that $$S_k(t) = S_i(t), \forall t \; \forall_k^i \in N \quad (5)$$

And thus follow that:

$$\tilde{R}_k(t) = \frac{r_k}{\sum_{i \in B_k} r_i} = R_k \quad (6)$$

$R_k$ defined in (6) is the fraction of service which an arbitrary node k must receive in the scope of an ideal scheduling, no matter how small the observation interval, while $\tilde{R}_k(t)$ is the actual service portion received up to time t. Any one real scheduling diverges from the ideal mainly for two reasons: (1) it is not possible to serve all entities simultaneously; (2) every entity can receive service for a distinct time period, not infinitesimal. Consequently, the various contending entities will have received from a real scheduling, in an arbitrary time instant, no longer identical service amounts: the object of a real scheduling, therefore, is to approximate an ideal as close as possible, or in other terms, arrange it such that $\tilde{R}_k(t)$ diverges as little as possible from $R_k$.

Figure 2:
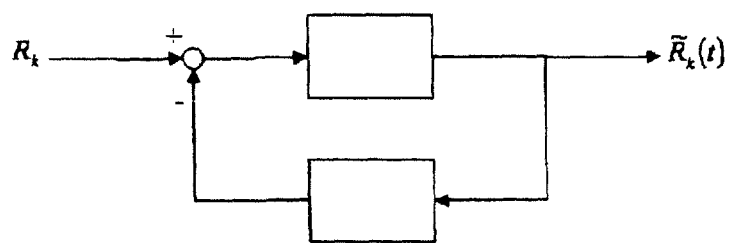
FIG. 2 schematises an algorithm according to the present invention.

The real scheduling, therefore, can be represented as a retro-activated system (FIG. 2), where $R_k$ is the objective value which $\tilde{R}_k(t)$ must follow.

In summary, the objective of the scheduling algorithm proposed below is that of maintaining $\tilde{R}_k(t)$ as close as possible to the reference value $R_k$.

Once again, an arbitrary node is considered k, NK. In the time instant $t_k^{p-1}$, its last transmission attempt terminated (of the packet (p-1)-th), and by the (1), the following equation holds true:

$$\sum_{\substack{i \in B_k \\ i \neq k}} \Delta t_i(t_k^{p-1}) = \left(\frac{1}{\tilde{R}_k(t_k^{p-1})} - 1\right)\Delta t_k(t_k^{p-1}) \quad (7)$$

The node k must, therefore, determine the waiting time at the end of which it attempts the transmission of the next p-th packet. In order to reduce, if not eliminate possible imbalances in the use times of the channel between k itself and the other nodes in $B_k$, the new waiting time must be set such that the use fraction at the end of the transmission of the new packet, therefore in time $t_k^p$, is equal to that determined by the ideal scheduling objective:

$$\tilde{R}(t_k^p) = \frac{\Delta t_k(t_k^p)}{\sum_{i \in B_k} \Delta t_i(t_k^p)} = R_k \Leftrightarrow \sum_{\substack{i \in B_k \\ i \neq k}} \Delta t_i(t_k^p) = \left(\frac{1}{R_k} - 1\right)\Delta t_k(t_k^p) \quad (8)$$

Rewriting (8) the following is obtained:

$$\sum_{\substack{i \in B_k \\ i \neq k}} \Delta t_i(t_k^{p-1}) + \sum_{\substack{i \in B_k \\ i \neq k}} (\Delta t_i(t_k^p) - \Delta t_i(t_k^{p-1})) = \left(\frac{1}{R_k} - 1\right)\Delta t_k(t_k^p) \quad (9)$$

where the first sum represents how much the nodes in $B_k$ different from k used the channel up to $t_k^{p-1}$, while the second is how much they should transmit up to $t_k^p$. This last sum can be defined as the researched useful waiting time; "useful" since only the time actually used by the other nodes for transmitting is calculated, while possible idle times of the channel or possible collisions do not, in any case, lead to service tag variations. Hence, (9) becomes:

$$\sum_{\substack{i \in B_k \\ i \neq k}} \Delta t_i(t_k^{p-1}) + x_k(p) = \left(\frac{1}{R_k} - 1\right)\Delta t_k(t_k^p) \quad (10)$$

where $x_k(p)$ is the unknown quantity to be evaluated.

Applying (7) to (10) one obtains:

$$\left(\frac{1}{\tilde{R}_k(t_k^{p-1})} - 1\right)\Delta t_k(t_k^{p-1}) + x_k(p) = \left(\frac{1}{R_k} - 1\right)\Delta t_k(t_k^p) \quad (11)$$

$\Delta t_k(t_k^p)$ can be expressed as:

$$\Delta t_k(t_k^p) = \Delta t_k(t_k^{p-1}) + t_{TX,k}^p, \quad (12)$$

where $t_{TX,k}^p$ is the quantity of time wherein the channel is occupied by the k for the transmission of its p-th packet (without considering the overhead introduced by the MAC). Applying (12) to (11) the x(p) expression is obtained:

$$x_k(p) = \left(\frac{1}{R_k} - \frac{1}{\tilde{R}_k(t_k^{p-1})}\right)\Delta t_k(t_k^{p-1}) + \left(\frac{1}{R_k} - 1\right)t_{TX,k}^p \quad (13)$$

It is possible to modify (13) such that the calculation uses the information which is immediately available to the node (its service tag and that of its neighbours). Applying the following equalities:

$$\Delta t_k(t_k^{p-1}) = \frac{r_k S_k^{p-1}}{C} \quad (14)$$

$$t_{TX,k}^p = \frac{(S_k^p - S_k^{p-1})r_k}{C} = \frac{r_k \Delta S_k^p}{C} \quad (15)$$

(13) can therefore be rewritten as:

$$x_k(p) = \left(\frac{1}{R_k} - \frac{1}{\tilde{R}_k(t_k^{p-1})}\right)\frac{r_k S_k^{p-1}}{C} + \left(\frac{1}{R_k} - 1\right)\frac{r_k \Delta S_k^p}{C} \quad (16)$$

or equally as:

$$\frac{Cx_k(p)}{r_k} = \left(\frac{1}{R_k} - \frac{1}{\tilde{R}_k(t_k^{p-1})}\right)S_k^{p-1} + \left(\frac{1}{R_k} - 1\right)\Delta S_k^p \quad (17)$$

The first member can be further modified:

$$\frac{Cx_k(p)}{r_k} = \frac{\sum_{i \in B_k} r_i}{r_k} \frac{Cx_k(p)}{\sum_{i \in B_k} r_i} = \frac{1}{R_k}\frac{C}{\sum_{i \in B_k} r_i}x_k(p) \quad (18)$$

Observing that the second factor in (18) is precisely the normalised band per weight unit in $B_k$, the product of the last two terms represents the variation of normalised traffic of the system during $x_k(p)$. Applying (18) to (16), one finally obtains:

$$\Delta v_k^p = \frac{C}{\sum_{i \in B_k} r_i}x_k(p)$$

$$= \left[\left(\frac{1}{R_k} - \frac{1}{\tilde{R}_k(t_k^{p-1})}\right)S_k^{p-1} + \left(\frac{1}{R_k} - 1\right)\Delta S_k^p\right]R_k \quad (19)$$

(19), hence, calculates the amount of normalised traffic which must be transmitted in $B_k$ before the node k can transmit its p-th packet: it is the function of the service tag of the node k at the end of the penultimate transmission, of the contribution, in terms of normalised traffic, given by the p-th packet and by the fractions, ideal and real, of channel use. The evaluation of the last two terms, in particular, requires that station k has some information related to the nodes grouped in $B_k$: the weights $r_i$ and the amount of normalised traffic $S_i(t_k^{p-1})$ transmitted up to time $t_k^{p-1}$.

Two-Hop Neighbourhood With Respect to the One-Hop Neighbourhood

In the calculation of (19), as already shown, the node k must have the information related to all the nodes in $B_k$, which however includes all the stations spaced both one and two hops from k itself; if this may not be a problem regarding the weights, in a network with low dynamic levels the updated knowledge of the service tags of the stations two hops away could on the other hand be particularly critical.

It is nevertheless possible to demonstrate, even if qualitatively, that in conditions of a neighbourhood sufficiently uniform for the distribution of the weights and numerous, the average value of $\Delta v_k^p$ is not influenced by the definition of $B_k$.

Applying in (19) the distributive property of the product with respect to the sum one obtains:

$$\Delta v_k^p = \left(1 - \frac{R_k}{\tilde{R}_k(t_k^{p-1})}\right)S_k^{p-1} + (1 - R_k)\Delta S_k^p \quad (20)$$

which, substituting with:

$$\Delta S_k^p = S_k^p - S_k^{p-1} = S_k(t_k^p) - S_k(t_k^{p-1}) \quad (21)$$

becomes:

$$\Delta v_k^p = \left(1 - \frac{R_k}{\tilde{R}_k(t_k^{p-1})}\right)S_k(t_k^{p-1}) + (1 - R_k)\left(S_k(t_k^p) - S_k(t_k^{p-1})\right) \quad (22)$$

that is:

$$\Delta v_k^p = R_k\left(1 - \frac{1}{\tilde{R}_k(t_k^{p-1})}\right)S_k(t_k^{p-1}) + (1 - R_k)S_k(t_k^p) \quad (23)$$

Substituting, (4) and (6) in (23), one obtains:

$$\Delta v_k^p = \frac{r_k}{\sum_{i \in B_k} r_i}\left(1 - \frac{\sum_{i \in B_k} r_i S_i(t_k^{p-1})}{r_k S_k(t_k^{p-1})}\right)S_k(t_k^{p-1}) + \left(1 - \frac{r_k}{\sum_{i \in B_k} r_i}\right)S_k(t_k^p) \quad (24)$$

which becomes:

$$\Delta v_k^p = -\frac{1}{\sum_{i \in B_k} r_i}\sum_{\substack{i \in B_k \\ i \neq k}} r_i S_i(t_k^{p-1}) + \frac{\sum_{\substack{i \in B_k \\ i \neq k}} r_i}{\sum_{i \in B_k} r_i}S_k(t_k^p) \quad (25)$$

Summing the two addenda, (25) becomes:

$$\Delta v_k^p = \sum_{\substack{i \in B_k \\ i \neq k}} \frac{r_i}{\sum_{j \in B_k} r_j}\left(S_k(t_k^p) - S_i(t_k^{p-1})\right) \quad (26)$$

The term $S_k(t_k^p)$ can be written as:

$$S_k(t_k^p) = S_k(t_k^{p-1}) + \frac{L_k^p}{r_k} \quad (27)$$

Substituting (27) in (26) it follows that:

$$\Delta v_k^p = \sum_{\substack{i \in B_k \\ i \neq k}} \frac{r_i}{\sum_{j \in B_k} r_j} \left( S_k(t_k^{p-1}) - S_i(t_k^{p-1}) + \frac{L_k^p}{r_k} \right) \quad (28)$$

$$= \sum_{\substack{i \in B_k \\ i \neq k}} \frac{r_i}{\sum_{j \in B_k} r_j} \left( \Delta_{k,i}(t_k^{p-1}) + \frac{L_k^p}{r_k} \right)$$

where the following equality was applied:

$$\Delta_{k,i}(t_k^{p-1}) = S_k(t_k^{p-1}) - S_i(t_k^{p-1}). \quad (29)$$

(29) represents none other than the difference of transmitted normalised traffic, between the nodes k and i, immediately after the transmission of a packet by node k. In the correct functioning hypothesis of the algorithm (19), it should be said that the transmissions were distributed so to maintain $\tilde{R}_k(t)$ around $R_k$, and the average value of $\Delta_{k,i}(t_k^{p-1})$ can be assumed to be reasonably null. Thus, average (28) over time, in the (reasonable) ergodic process for the media, and indicating with $\bar{L}$ the average packet length, the following is obtained:

$$\langle \Delta v_k^p \rangle = \sum_{\substack{i \in B_k \\ i \neq k}} \frac{r_i}{\sum_{j \in B_k} r_j} \left( \langle \Delta_{k,i}(t_k^{p-1}) \rangle + \frac{\langle L_k^p \rangle}{r_k} \right) \quad (30)$$

$$= \frac{\bar{L}}{r_k} \frac{\sum_{\substack{i \in B_k \\ i \neq k}} r_i}{\sum_{j \in B_k} r_j}.$$

In conditions of sufficiently numerous neighbourhood, it is possible to hypothesize that $$\frac{\sum_{\substack{i \in B_k \\ i \neq k}} r_i}{\sum_{i \in B_k} r_i} \cong 1 \quad (31)$$

and therefore:

$$\langle \Delta v_k^p \rangle \cong \frac{\bar{L}}{r_k} \quad (32)$$

From (32) it follows that the average value is not influenced by the "composition" of the set $B_k$. Consequently, the generic node k can approximate (19), calculating it only on the basis of information coming from its hop neighbours, in other words considering the Bk set defined as $$Bk = \{i \in N | d(i,k) \leq 1\}$$

Back-Off Calculation

Once the amount of normalised traffic $\Delta v_k^p$ which the node k must transmit to the system before attempting to send a new packet has been estimated, it is possible to transform this value into a waiting time expressed in a form compatible with the underlying MAC protocol in the number of slots which the MAC sub-level must wait before accessing the channel.

The simplest adoptable approach consists of dividing $\Delta v_k^p$ by a pre-established and constant value, which represents the amount of normalised traffic normally cleared by the system into an idle slot. Such parameter, which we shall call dvs, depends therefore on the type of situation examined, or more in detail on the size of the neighbourhood: normalised traffic to be cleared $\Delta v_k^p$ being equal, in fact, a greater number of neighbours corresponds to a lower average growth rate of the "local" virtual time, and consequently a smaller value for the aforesaid constant, the idle slot number having to be higher per unit of normalised traffic.

The calculation method of the back-off illustrated up to now is completely deterministic. Advantageously, to avoid potential dead lock, it is in any case opportune to add a random amount. It is therefore proposed to use a uniform random variable, obtaining the back-off set by the node k for the transmission of the p-th packet equal to:

$$BO_k^p = \frac{\Delta v_k^p}{dvs} + b_{rv} \quad (33)$$

with $b_{rv} \sim U(0, \text{brv,max})$.

Collision Management

The final point to consider is the management of the collisions by the scheduling algorithm. When a generic host or node k of the network collides it can set the back-off:

(1) by reusing (33), and therefore recalculating $\Delta v_k^p$ through (19);

(2) by employing a policy of binary exponential type.

Of the two alternatives, the first is preferable since as previously discussed the scheme proposed attains the objective of fairness through the realisation of a feedback system, which tends to anticipate the transmissions of the stations which are late and defer those of the nodes which are ahead.

Therefore, if the station k collides it will in all probability be late with respect to its competitors, and consequently it will tend to precede them in the next transmission. Its neighbours, on the other hand, will probably be ahead, and will delay their transmissions, giving space to k. This should ensure: a reduction of the time window in which the system is unfair due to the collisions; coordination between the channel access attempts such to increase the probability of the correct transmission in the subsequent attempt (not considering possible channel errors aside from those due to the collisions).

Example of Algorithm Design in Accordance to the Invention

In this section, the most important aspects related to the design of the algorithm are described in accordance to a particular embodiment of the invention. Such design takes on all of the details whose definition is fundamental for the correct functioning of the algorithm summarised by equations (19) and (33). The scheduling of the invention can be advantageously implemented as a sub-level placed immediately above the MAC protocol: it accepts packets from the higher levels and passes them to the MAC protocol itself immediately after having set their back-off counter to the number of idle slots calculated based on the previously mentioned formulas; it also receives packets from the lower-level MAC, reads the control information memorised in them and possibly sends them towards the upper levels of the stack.

To execute the basic function expressed by the formula (19), one node requires the updated knowledge of its one hop neighbourhood, i.e. the weight and current service tag of every neighbour. For this, every station keeps a table of its neighbours: every entry contains three fields, the ID (address) of the node, its status and a refresh time (the time instant corresponding to the last line update). The status, in turn, contains two fields: the weight and the service tag. The refresh time, in particular, serves an entity to recognise a node's exit from the set of its competitors: among the various possible causes, the most important which this field permits managing is given by the suspension of data packet transmissions by a nearby node; in this case this nearby node is no longer considered as a competitor for the channel.

Together with the table of the neighbours, every node manages a timer T, which serves for understanding when the node itself must no longer consider itself as a traffic source, and therefore give up contending with the others for the channel use. The scheduling, in fact, serves for managing the accesses by all the stations which have packets waiting. It can clearly occur that one node, at the end of the current sending, no longer has anything to send: there is therefore the problem of how to consider this entity regarding the scheduling, also with respect to the need that its status is known by all its neighbours.

It was immediately clear that a node cannot consider itself "off sides" immediately after having completed sending the packets, since this approach, in addition to introducing an excessive dynamism in the system, would not take into account the behaviour variations of the system (e.g. Burst traffic sources). From these considerations, therefore, it was chosen to associate every entity with the timer T, to identify the maximum time interval in which a node may not transmit packets: within this interval, the node is still considered a competitor, so that it maintains its service tag unchanged; once this limit is exceeded, however, it becomes entirely inactive, and the service tag itself begins to increase, following that which the scheduler reads from the data packs received from any one neighbour, consequently losing every possible band credit. The timeout value which is assigned to the timer is identical to the maximum time slot during which a neighbourhood table entry may not be updated.

The updating of the entries of the neighbours' table is entrusted to an exchange of control information, implemented by combining the need to remain independent from the particular MAC protocol adopted with the will to introduce as little control overhead as possible: a small header is added by the schedule to every packet in transmission phase; the packets contains, in only two fields, the weight and the current service tag of the node. This little modification is based on one of the peculiar characteristics of the wireless channel, that is the fact that the transmissions on it are intrinsically broadcast. Assuming that it can make the radio interface of every node operate in promiscuous mode (the MAC sub-level propagates, towards the upper levels, any correctly received packet, apart from the destination address indicated in the related MAC header), the scheduler of every node is capable, excluding possible errors, of receiving the data packet transmitted by any of its neighbours, and, reading the control header, of updating the corresponding entry in the neighbours' table.

The scheduling can be found in two states, called IDLE and TX: the first is the start state, and moreover is examined, beginning by the state TX, when the node at the end of the transmission of the current packet has no other packets waiting to be sent; the second, on the other hand, represents the ordinary operation condition when it is waiting for the reply for the transmission of a packet previously sent to the MAC.

In IDLE, the scheduling is waiting for one of three possible entrances. The first is the packet coming from the high level (called hol—Head Of Line): in this case, the scheduler calculates the idle slots, sets the back-off, and after having reached its control header, passes the data packet to the MAC, transforming the current state into TX. The second entrance is the timeout of the timer T, which does not generate particular actions. The third entrance, finally, is a data packet from the MAC: after having read its control header, and having updated the related entry of its neighbours' table, the scheduler either discards it or sends it to the higher levels depending on whether the destination address indicated in the MAC header is that of the node in question. Upon reception of a data packet in the IDLE state, moreover, the updating of the service tag of the node is only connected, however, in the case wherein the timer T has already expired—before, in fact, the node is still in every respect a competitor.

Also in the TX state which, it should be remembered, is the state wherein the scheduler awaits the reply of a data packet sent to the MAC—there are three possible entrances. The first is a new data packet coming from the higher levels, which is simply memorised in a queue, waiting for the previous traffic to clear. The second is a data packet from the MAC: the treatment is identical to that described for the IDLE state, except for the fact that the service tag of the node does not undergo any updating here (the entity is evidently active, and competes with its neighbours for the use of the channel). The third and final entrance is given by the end transmission signal coming from the MAC: if the signal is negative (failed channel access or no ACK frame received), after having updated the collisions counter of the current packet (see below), the scheduler calculates the new value of the back-off and passes the same packet to the MAC for a new attempt; if, instead, the signal is positive (transmission successfully executed), the scheduler updates its own service tag, draws a new packet from the queue and, as for the other cases, calculates the back-off, inserts its own control header and passes the packet to the MAC. In the case where the queue is empty, it returns to the IDLE state, after however having activated the timer T.

A separate explanation must be made for the counter of the collisions sustained by the current packet. Equation (19), following the properties highlighted in the preceding section, is used by the BDNS algorithm for every transmission, independent of whether the packet involved is new or not. At every collision, however, the equation (19) tends, opposite to that done by BEB, to diminish the idle slot number, making the node "meaner" in its attempts to access the channel. In a precautionary manner, with respect to possible blocks which this behaviour can generate, it was decided to permit the node to apply (19) for a limited number of consecutive relays: beyond this limit, the BDNS policy is substituted by the BEB policy, until there is correct reception. The collision counter therefore serves to identify the point wherein it is necessary to pass from one back-off calculation method to another.

Functioning Method of the Network 100

Figure 3A:
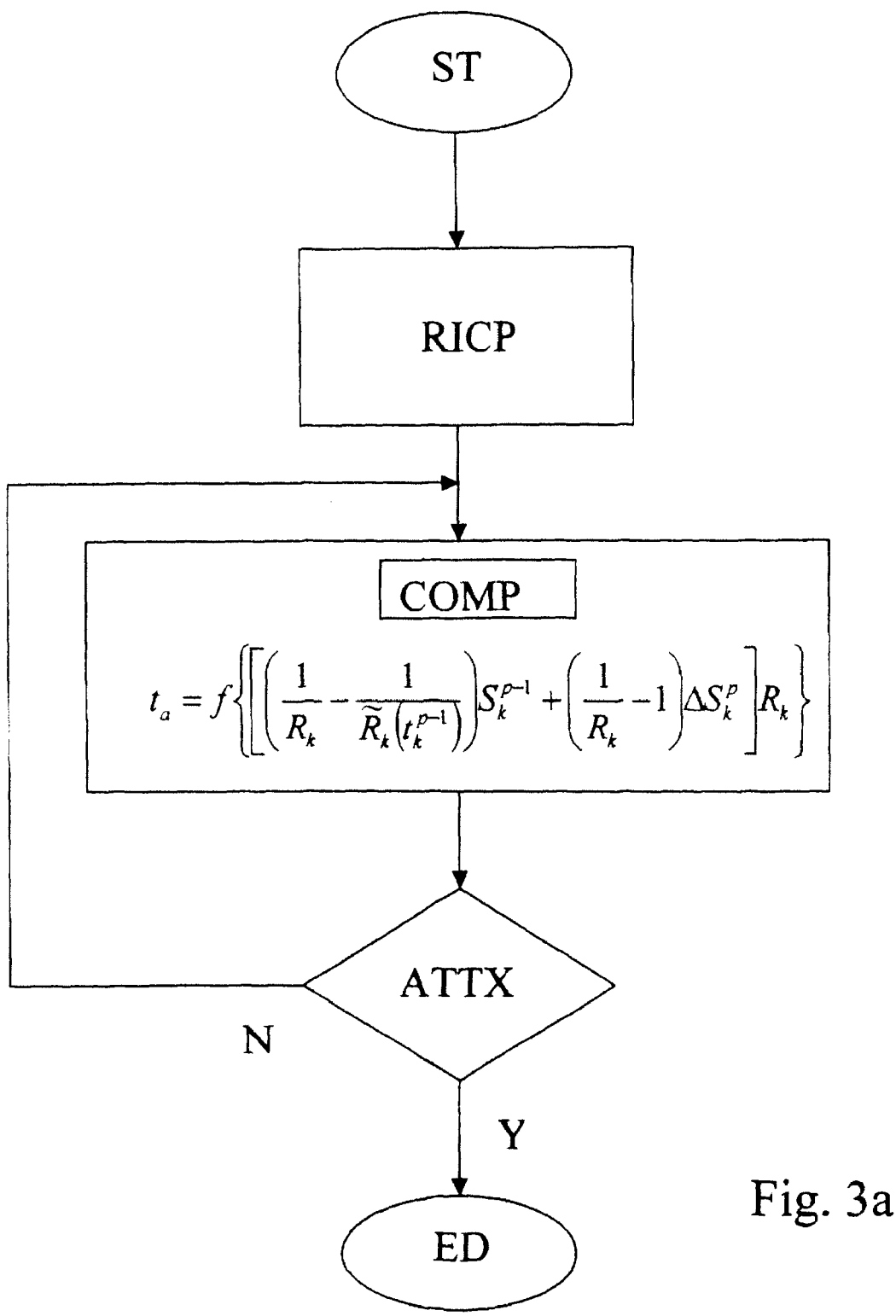
FIG. 3a shows a flow diagram of several steps of an example of a method of scheduling in accordance with the present invention.

With reference to FIG. 3a, a functioning example of the network 100 will now be described in which the nodes Nk-NT operate according to the above described scheduling algorithm. In this example, reference will be made to the behaviour of the single node Nk since that of the other nodes is analogous.

After a symbolic initial step ST, the method provides a step (RICP) wherein the node Nk has a packet to transmit available. Such packet of information may have been received by the node Nk because it was transmitted to it by other nodes, or it can be generated by the node Nk itself.

The node Nk therefore applies the algorithm in accordance with the invention in order to calculate (COMP step) the waiting time before attempting the packet transmission.

Figure 3B:
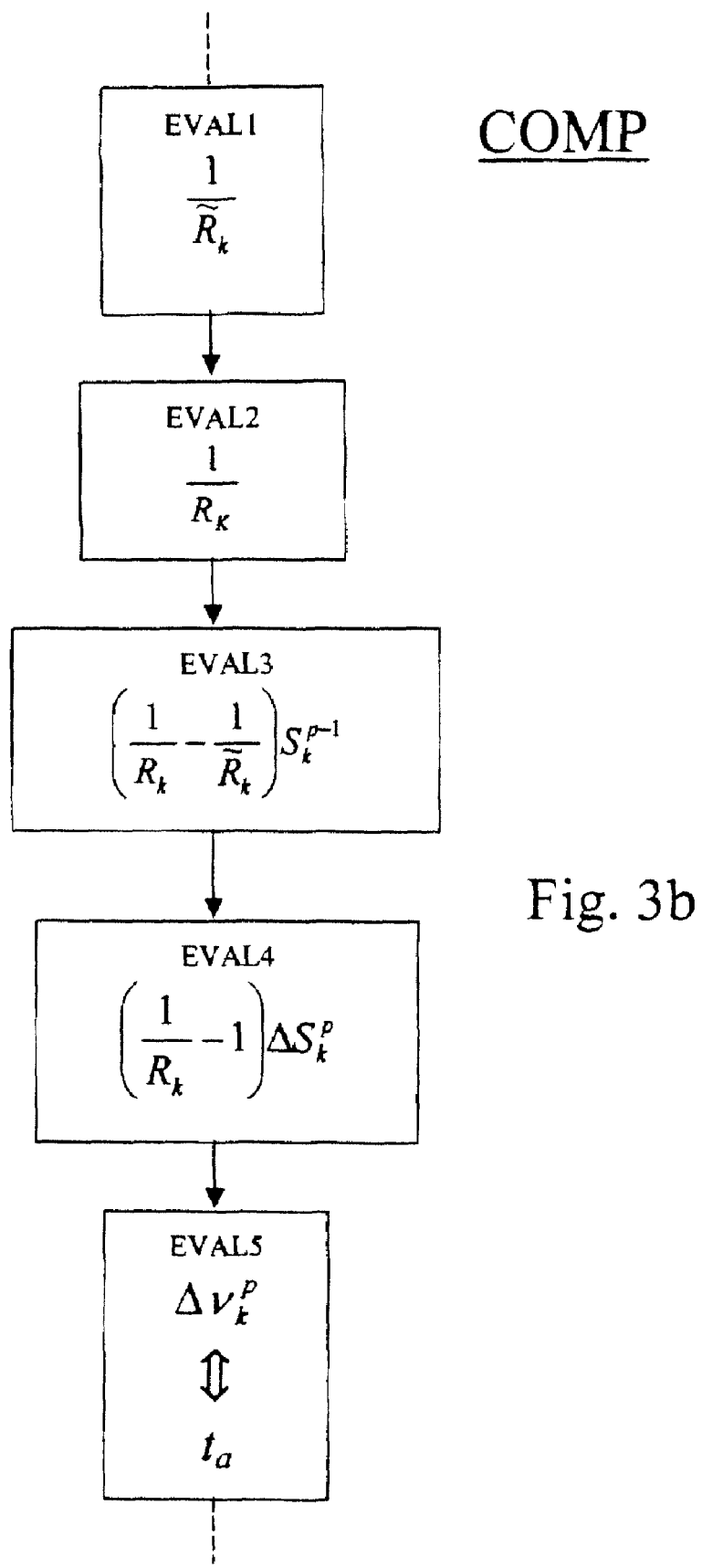
FIG. 3b shows a flow diagram related to the calculation of a waiting time employable in said method.
Figure 4:
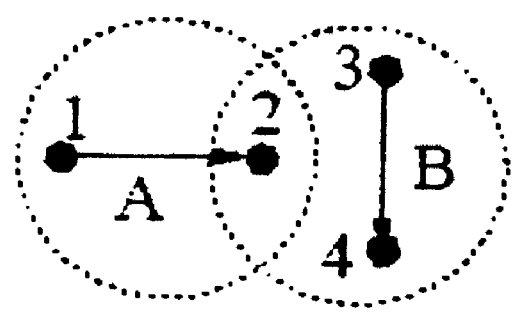
FIG. 4 and FIG. 5 schematically show disadvantageous situations of the state of the art.
Figure 5:
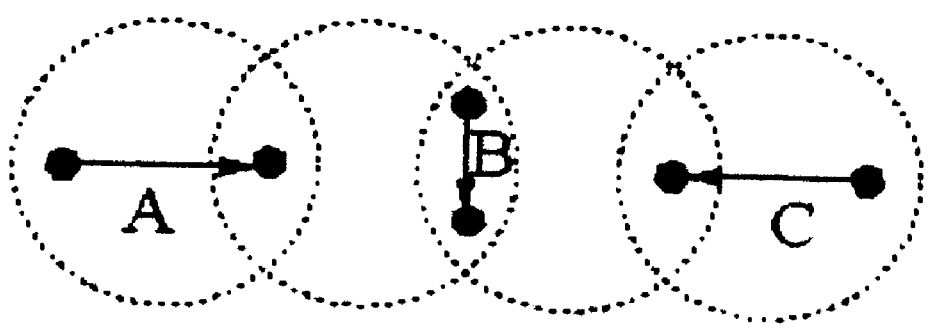

As indicated in FIG. 3a, the waiting time can be calculated by the above obtained expression (19). Shown in greater detail in FIG. 3b are the calculation steps of the waiting time corresponding with the COMP step.

The COMP step includes a step (EVAL1) of evaluation of a first size (i.e. the quantity $$\frac{1}{\tilde{R}_k(t_k^{p-1})})$$

representative of the ratio (or rather, of the quantity $\tilde{R}_k(t_k^{p-1})$) between a real use of the channel by the node NK and a real use of the cannel by a particular group of nodes of the network 100, during the transmission on the network of other packets preceding the one to be transmitted.

Such group of nodes considered in the evaluation of the first size can comprise all of the nodes two hops away from the node Nk, such as for example the nodes N4 and N6 of FIG. 1. Alternatively, as was previously demonstrated to be possible, such group of nodes can comprise all the nodes one hop away from the node Nk such as for example the nodes N2 and N3 of FIG. 1.

The method moreover provides an evaluation step (EVAL2) of a second size ($1/R_k$) representative of an ideal use of the channel by the first node with respect to the nodes belonging to the above defined group of nodes.

In a further calculation step (EVAL3) the difference $$\left(\frac{1}{R_k} - \frac{1}{\tilde{R}_k(t_k^{p-1})}\right)$$

between the second and first size is evaluated, multiplying it by a value corresponding with a first amount of traffic associated with said additional packets ($S_k^{p-1}$).

The steps EVAL1, EVAL2 and EVAL3 schematise the calculation of the first term of the expression (19).

The method corresponding to the algorithm of the invention also provides the calculation (EVAL4 step) of the second term $$\left(\left(\frac{1}{R_k} - 1\right)\Delta S_k^p\right)$$

of the expression (19), a function of a second amount of traffic ($\Delta S_k^p$) associated with said packet to be transmitted and with said second size $$\left(\frac{1}{R_k}\right).$$

The sum of the first and the second term is carried out in the step EVAL5; the sum is then combined (in particular, multiplied) with said quantity $R_k$. In other words, in the EVAL5 step the size $\Delta v_k^p$ is obtained, which as seen is representative of the quantity of normalised traffic which said group of nodes, aside from the node Nk, will transmit before the node Nk attempts to transmit the packet.

It is clear that the size $\Delta v_k^p$ increases or decreases, respectively, with the decreasing or increasing of the first size, i.e. the quantity $$\frac{1}{\tilde{R}_k(t_k^{p-1})}.$$

Advantageously, the size $\Delta v_k^p$ is further processed to obtain the waiting time "ta" (or back-off) expressed in the form compatible with the particular access protocol employed. For example, the waiting time can be expressed in time slots as indicated in the formula (33).

As indicated in FIG. 3a, after the calculation of the waiting time ta and after a wait equal to ta, the node Nk may proceed to the packet transmission attempt (ATTX step). In case of success (Y branch), the packet was transmitted to another node of the network 100 in a conventional manner. In case of failure (N branch) due to collision with other nodes, the method resumes the COMP step for the evaluation of a new waiting time.

The invention claimed is:

1. A method of fair scheduling for channel access in a wireless network comprising a plurality of nodes including a first node and a group of further nodes comprising at least one second node, the method comprising the steps of:
   arranging a packet to be transmitted at the first node;
   calculating a waiting time for the first node;
   the first node attempting the transmission of the packet on the channel at least after the calculated waiting time;
   wherein said waiting time calculating step further includes:
   (a) evaluating by the first node a first parameter of channel use corresponding to a time delay obtained by the first node for the transmission on the network of further packets preceding said packing in a preceding time span;
   (b) receiving at the first node from each of the nodes of said group of further nodes, respective information of channel use representative of the time of channel use obtained by said each node, for the transmission on the network of further packets preceding said packet in said preceding time span, wherein said respective information of channel use is evaluated and made available by said each node; and
   (c) calculating a first size representative of a ratio between a real use of the channel by the first node and a real use of the channel by said group of further nodes, during said preceding time span,
   wherein said calculating step is performed by the first node on the basis of knowledge of said first parameter of channel use and of said respective information of channel use made available by each node of said group of further nodes.

2. The method according to claim 1, wherein said waiting time increases or decreases as said ratio increases or decreases, respectively.

3. The method according to claim 2, further comprising evaluating a second size representative of an ideal use of the channel by the first node with respect to nodes belonging to said group.

4. The method according to claim 3, wherein said waiting time is calculated based on a difference between the second and first size.

5. The method according to claim 4, wherein the waiting time is calculated based on a first amount of traffic ($S_k^{p-1}$) associated with said further packets.

6. The method according to claim 5, further comprising evaluating a first term starting from a product operation between said first amount and said difference.

7. The method according to claim 6, further comprising evaluating a second term based on a second amount of traffic associated with said packet to be transmitted and based on said second size.

8. The method according to claim 7, wherein said waiting time is evaluated based on a combination of a sum of the first and second term with a value associated with said second size.

9. The method according to claim 1, wherein said network is of a MCD (Multi Collision Domain) type.

10. The method according to claim 1, wherein said network is of a SCD (Single Collision Domain) type.

11. The method according to claim 10, wherein said network is of a WLAN (Wireless Local Area Network) type.

12. The method according to claim 1, wherein said first and at least one second node each comprise a device selected from the group consisting of cellular telephones, PDAs, Personal Computers.

13. The method according to claim 1, wherein said network is a network of an Ad-Hoc type.

14. The method according to claim 13, wherein said network operates in a Multi Hopping mode.

15. The method according to claim 7, wherein said first and second traffic amounts are normalised with respect to a weight associated with the first node.

16. The method according to claim 1 wherein said method is implemented under Medium Access Control, MAC protocol.

17. The method according to claim 16, wherein said protocol is the 802.11 MAC protocol.

18. The method according to claim 16, further comprising:
obtaining a size representative of the amount of normalised traffic which said plurality of nodes, except the first node, transmits before the first node attempts the transmission of said packet; and
processing said size in order to obtain the waiting time expressed in a form compatible with the underlying MAC protocol.

19. The method according to claim 18, wherein said time is expressed in the form of time slots.

20. The method according to claim 1, wherein said first node comprises memorisation means to store data related to a weight and an amount of transmitted current normalised traffic associated with the other nodes of said group, said data being made available to the first node by the nodes of said group.

21. The method according to claim 20, wherein said group includes the first node and said at least one second node, said at least one second node being placed one hop away from the first node.

22. The method according to claim 21, wherein said at least one second node includes a further node placed two hops away from the first node.

23. The method according to claim 1, wherein said method is dynamic in that the calculation of the waiting time is repeated for every subsequent packet to be transmitted.

24. A node of a wireless network comprising a plurality of nodes including a first node and at least one second node and a radio channel employable for the communication between said nodes; the node being provided with processing means capable of carrying out the method of scheduling of channel access as defined by claim 1.

25. A processor including a computer program loaded in memory means thereof of a first node of a wireless network comprising a plurality of nodes including a first node and at least one second node and a radio channel employable for the communication between said nodes, characterised in that said processor is suitable for carrying out the method of scheduling of channel access as defined by claim 1.

26. A wireless network comprising a plurality of nodes including a first node and at least one second node and a radio channel employable for the communication between said nodes; at least two of said nodes comprising processing means capable of carrying out the method of scheduling of channel access as defined by claim 1.

27. The method according to claim 1, wherein said information representative of the time of channel use obtained by said each node of said group of further nodes comprise a weight parameter and a service tag parameter, representative of normalized service received by said node in said time span.

* * * * *